(12) United States Patent
Shi et al.

(10) Patent No.: US 6,921,454 B2
(45) Date of Patent: Jul. 26, 2005

(54) ELASTOMER TOUGHENED RADIATION CURABLE ADHESIVES

(75) Inventors: Weitong Shi, Glastonbury, CT (US); JoAnn DeMarco, Wethersfield, CT (US); Shabbir Attarwala, Simsbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 391 days.

(21) Appl. No.: 09/994,073

(22) Filed: Nov. 27, 2001

(65) Prior Publication Data

US 2003/0100624 A1 May 29, 2003

(51) Int. Cl.⁷ .............................. C08J 3/28; C09J 4/06; C09J 109/00; C09J 123/34; C09J 127/12
(52) U.S. Cl. ............................... 156/275.5; 156/275.7; 156/272.2; 428/421; 428/423.1; 428/480; 428/500; 428/521; 428/522; 428/523; 522/31; 522/66; 522/120; 522/121; 522/122; 522/111; 522/141; 522/142; 522/143; 525/55; 525/88; 526/332; 526/333; 526/334
(58) Field of Search ............................ 522/31, 66, 111, 522/114, 120, 121, 122, 135, 141, 142, 143; 526/332, 333, 334

(56) References Cited

U.S. PATENT DOCUMENTS

| | | | |
|---|---|---|---|
| 3,496,250 A | 2/1970 | Czerwinski | 260/836 |
| 3,655,825 A | 4/1972 | Souder et al. | 260/876 R |
| 3,668,274 A | 6/1972 | Owens et al. | 260/857 G |
| 3,864,426 A | 2/1975 | Salensky | 260/837 R |
| 4,058,400 A | 11/1977 | Crivello | 96/86 P |
| 4,219,654 A | 8/1980 | Crivello | 546/342 |
| 4,223,115 A | 9/1980 | Zalucha et al. | 525/455 |
| 4,320,188 A * | 3/1982 | Heinz et al. | 430/281.1 |
| 4,388,450 A | 6/1983 | Crivello | 525/502 |
| 4,438,234 A | 3/1984 | Rosenquist et al. | 524/378 |
| 4,440,910 A | 4/1984 | O'Connor | 525/295 |
| 4,452,944 A | 6/1984 | Dawdy | 525/126 |
| 4,769,419 A | 9/1988 | Dawdy | 525/111 |
| 5,070,117 A | 12/1991 | Klemarczyk et al. | 522/31 |
| 5,079,378 A | 1/1992 | Crivello | 556/64 |
| 5,130,384 A * | 7/1992 | Damewood et al. | 525/455 |
| 5,139,872 A | 8/1992 | Lapin et al. | 428/375 |
| 5,314,929 A | 5/1994 | Crivello et al. | 522/31 |
| 5,340,873 A | 8/1994 | Mitry | 525/10 |
| 5,385,958 A * | 1/1995 | Bachmann et al. | 522/170 |
| 5,486,545 A | 1/1996 | Crivello | 522/31 |
| 5,567,858 A | 10/1996 | Crivello | 568/616 |
| 5,641,834 A | 6/1997 | Abbey et al. | 525/77 |
| 5,710,235 A | 1/1998 | Abbey et al. | 528/288 |
| 5,992,314 A * | 11/1999 | Lorenz et al. | 101/128.21 |
| 6,008,312 A * | 12/1999 | Shirasaka | 528/75 |
| 6,225,408 B1 | 5/2001 | Huang et al. | 525/88 |
| 6,346,300 B1 * | 2/2002 | Ruepping | 427/517 |
| 6,376,070 B1 * | 4/2002 | Nakasuga et al. | 428/355 EP |
| 6,608,148 B1 * | 8/2003 | Kuroda et al. | 525/533 |
| 6,627,762 B1 * | 9/2003 | Woods et al. | 549/229 |

FOREIGN PATENT DOCUMENTS

| | | | |
|---|---|---|---|
| JP | 05214298 | 8/1993 | C09J/4/00 |
| JP | 07228842 | 9/1995 | C09J/4/00 |
| JP | 2002-64911 | 3/1999 | C08F/2/50 |
| WO | WO 97/390074 | 10/1997 | C09J/4/00 |

OTHER PUBLICATIONS

Decker, Christian, "High–Speed Curing by Laser Irradiation", Nucl. Instr. and Meth. in Phys. Res. B 151 (1999), pp. 22–28.

* cited by examiner

Primary Examiner—Susan Berman
(74) Attorney, Agent, or Firm—Steven C. Bauman

(57) ABSTRACT

A radiation curable adhesive composition which includes:

a) an α,β-olefinically unsaturated ether monomer component consisting of one or more compounds having the formula:

$$R[O\text{—}CH\text{=}CHR^1]_n \qquad (I)$$

where R is an n-valent carbon-linked organic group $R^1$ is H or a monovalent carbon-linked organic group and n has a value of 1 or more, b) an elastomeric polymer having a tensile strength at break of greater than 1500 psi (10342 kPa), and an elongation at break of greater than 100%, and c) a cationic photoinitiator.

40 Claims, No Drawings

US 6,921,454 B2

ELASTOMER TOUGHENED RADIATION CURABLE ADHESIVES

FIELD OF THE INVENTION

The present invention pertains to radiation curable adhesives prepared using vinyl or propenyl ether monomers.

BRIEF DESCRIPTION OF RELATED TECHNOLOGY

Adhesives containing (meth) acrylate or cyanoacrylate monomers and polymeric toughening agents are described in e.g. U.S. Pat. No. 4,440,910 (O'Connor), U.S. Pat. No. 5,340,873 (Mitry), and U.S. Pat. No. 6,225,408 (Huang et al).

Vinyl ethers are reported as mold release agents in compositions with thermoplastic resins in U.S. Pat. No. 4,438,234 (Rosenquist, et al.).

Curable vinyl ether formulations have been reported, primarily as coating formulations.

Release coating formulations employing vinyl ether monomers are described in U.S. Pat. No. 5,314,929 (Crivello, et al).

U.S. Pat. No. 5,139,872 (Lapin, et al.) describes optical fiber coating formulations based on vinyl ethers.

U.S. Pat. No. 5,567,858 (Crivello) and U.S. Pat. No. 5,486,545 (Crivello) describe multifunctional propenyl ethers said to be useful as coatings, sealants, varnishes and adhesives.

U.S. Pat. No. 4,388,450 (Crivello) describes aromatic polyvinyl ethers and heat curable molding compositions obtained therefrom. U.S. Pat. No. 5,070,117 (Klemarczyk et al) describes aromatic vinyl ethers, compositions thereof and methods of making same.

While, in some of these cases, vinyl and/or propenyl ether monomer compositions are said to be utilizable as adhesives, they are generally unsuitable as such since they react very rapidly, discoloring and disrupting substrate/adhesive interfaces, have poor cure through depth, low viscosity, and poor toughness. Heretofore the use of elastomer polymers in compositions of cationically polymerizable vinyl or propenyl ether monomers has not been described.

SUMMARY OF THE INVENTION

The invention pertains to light curable adhesive compositions employing an $\alpha,\beta$-olefinically unsaturated ether monomer such as a vinyl ether or propenyl ether monomer. The compositions of the invention give a less vigorous reaction, have higher viscosities, provide better cure through depth and provide better cured toughness than prior art radiation curable compositions prepared from such monomers. These properties make the inventive compositions much more suitable as adhesives than previous formulations embodying such monomers.

In one aspect, the invention is a radiation curable adhesive composition comprising:

a) an $\alpha,\beta$-olefinically unsaturated ether monomer component consisting of one or more compounds having the formula:

     (I)

where R is an n-valent carbon-linked organic group $R^1$ is H or a monovalent carbon-linked organic group, suitably H or alkyl such as methyl, and n has a value of 1 or more, b) an elastomeric polymer having a tensile strength at break of greater than 1500 psi (10342 kPa), and an elongation at break of greater than 100%, and c) a cationic photoinitiator.

In another aspect, the invention is a method of bonding comprising:

A) applying a composition as described above to a substrate,

B) joining a second substrate, at least one of the substrates being transmissive to energy effective to activate the photoinitiator, and C) transmitting energy effective to activate the photoinitiator through said transmissive substrate to the composition to effect cure of the composition.

Bonded assemblies produced from the inventive adhesive formulations represent a further aspect of the invention.

DETAILED DESCRIPTION OF THE INVENTION

All published documents, including all U.S. patent documents, mentioned anywhere in this application are hereby expressly incorporated herein by reference in their entirety. Any copending patent applications, mentioned anywhere in this application are also hereby expressly incorporated herein by reference in their entirety.

The compositions contain a an $\alpha,\beta$-olefinically unsaturated ether monomer component consisting of one or more compounds having the formula:

     (I)

where R is an n-valent carbon-linked organic group $R^1$ is H or a monovalent carbon-linked organic group, n has a value of 1 or more, suitably 1 to 100, more typically 1–6. Examples of suitable R and R' groups include 1–40 carbon aromatic or aliphatic hydrocarbon groups, especially saturated linear, branched or cyclic aliphatic hydrocarbon groups; polyethers; cycloethers, for instance polysaccharide residues; residues of hydroxyl terminated urethane oligomers; and residues of hydroxyl terminated polyesters. In some embodiments R' may be H or an alkyl group of 1–10 carbon atoms, especially H (i.e. a vinyl ether), or methyl (i.e. a propenyl ether). Suitably the $\alpha,\beta$-olefinically unsaturated ether monomer of formula I is employed in the composition in an amount of from about 20% to about 98% by weight of the composition.

Examples of specific vinyl ethers which may be utilized in the inventive compositions include butyl vinyl ether, hydroxy butyl vinyl ether, cyclohexyl vinyl ether, phenoxy vinyl ether, 2-ethylhexyl vinyl ether, lauryl vinyl ether, cetyl vinyl ether, and octadecyl vinyl ether; the divinyl ethers of hexanediol, cyclohexane dimethanol, triethylene glycol, bisphenol A, alkoxylated bisphenol A and tetraethylene glycol; di and trivinyl ethers of glycerol or trimethylolpropane; and the di, tri or tetravinyl ethers of pentaerythritol. Further examples of such compounds may be found in U.S. Pat. No. 4,388,450 (Crivello); U.S. Pat. No. 5,139,872 (Lapin et al) and U.S. Pat. No. 5,314,929 (Crivello et al).

Examples of propenyl ethers include 1,2-dipropenoxyethane, 1,4-dipropenoxybutane, 1,6-propenoxyhexane, 1,3-dipropenoxypropane, 1,4-cyclohexanedimethanol dipropenyl ether, 1,4-cyclohexane dipropenyl ether, 1,2-dipropenoxypropane, 1,10-dipropenoxydecane, 1,8-dipropenoxyoctane, 1,2,3-tripropenoxypropane, 1,2,3,4-tetrapropenoxybutane, sorbitol hexapropenyl ether, trimethylolpropane tripropenyl ether, pentaerythritol tetrapropenyl ether, 1,2-dipropenoxycyclopentane, 1,3-dipropenoxyperfluoropropane, diethyleneglycol dipropenyl ether, tetraethyleneglycol dipropenyl ether, and 3,4-dipropenoxytetrahydrofuran. The products may consist of pure isomers or mixtures of cis and trans isomers. Further examples of such compounds may be found in U.S. Pat. No. 5,567,858 (Crivello) and U.S. Pat. No. 5,486,545 (Crivello).

The compositions of the invention also include an elastomeric polymer toughener, or mixture thereof. For purposes of the present invention the elastomeric polymer toughener may be characterized as one having a tensile strength at break of greater than 1500 psi (10342 kPa), preferably greater than 2000 psi (13790 kPa), and an elongation at break of greater than 100%, preferably greater than 200%. The toughening polymer will typically, but always be a block copolymer, including terpolymer, with a Tg of one block segment below −20° C. Suitably the elastomeric polymer is one which is dissolvable or highly swellable in the vinyl ether or propenyl ether monomer utilized in the formulation. Examples of suitable polymer tougheners include acrylic rubbers, butadiene/acrylonitrile rubber, styrene/butadiene rubber, buna rubber, polyisobutylene, polyisoprene, natural rubber, polyurethane rubbers, ethylene-vinyl acetate polymers, fluorinated rubbers, isoprene-acrylonitrile polymers, chlorosulfonated polyethylenes, homopolymers of polyvinyl acetate, etc. Preferred polymer tougheners include acrylic rubbers and millable polyurethane rubbers.

The acrylic rubbers may be selected from a wide range of suitable materials. Most frequently these rubbers are either: (i) homopolymers of alkyl esters of acrylic acid; (ii) copolymers of another polymerizable monomer with an alkyl ester of acrylic acid or with an alkoxy ester of acrylic acid; (iii) copolymers of alkyl esters of acrylic acid with each other; (iv) copolymers of multiple alkoxy esters of acrylic acid with each other; or (v) mixtures of any of the above (i)–(iv). Other unsaturated monomers which may be copolymerized with the alkyl and alkoxy acrylic esters include dienes, reactive halogen-containing unsaturated compounds and other acrylic monomers such as acrylamides. The acrylic rubbers may also include (meth)acrylic acid esters in limited amounts, suitably copolymerized with an acrylate ester or with a lower alkene.

The choice of the elastomer will, to a large degree, dictate various properties and characteristics of the adhesive composition and such choices are easily determined through general experimentation and known methods within the art. It is most effective to use elastomers whose molecular weight averages more than about 100,000, but any molecular weight greater than 5,000 would be expected to effect an improvement. As a principle of general guidance, the molecular weight should be high enough to produce toughening but not so high that the adhesive is very stringy and difficult to apply. It is also best to choose an elastomer whose Mooney viscosity (ML(1+4)) is between 20 and about 60, and whose glass transition temperature (Tg) is 15° C. or less. These specific limitations are not absolute and various acrylic rubbers which do not fall within them may be within the scope of this invention.

The elastomeric polymer toughener used in the present invention can also be, for example, an A-B-A block copolymer wherein the A block is polymerized segment of styrene, alpha-methyl styrene, t-butyl styrene, or other ring alkylated styrene, acrylonitrile, methyl methacrylate, or a mixture of some or all of the above and the B block is an elastomeric segment having a low $T_g$ such as that derived from a conjugated diene or copolymer thereof or is an ethylene-propylene polymer. Commercially available examples include EUROPRENE SOL T 193A™ available from Enichem Elastomers Americas, Inc.

As an example of a millable polyurethane there are the MILLATHANE polymers such as MILLATHANE 66 and MILLATHANE 76, available from TSE Industries.

Other references describing copolymers which are suitable for use as tougheners include U.S. Pat. No. 3,496,250 (Czerwinski), U.S. Pat. No. 3,655,825 (Souder et al), U.S. Pat. No. 3,668,274 (Owens et al) and U.S. Pat. No. 3,864,426 (Salensky). Preferred commercially available copolymers which can be used as is or treated as described below include BLENDEX BTA III F, ACRYLOID KM 680, ACRYLOID KM 653, ACRYLOID KM 611, and ACRYLOID KM 330 copolymers, all of which are commercially available from Rohm and Haas Company, BLENDEX 101 copolymer, commercially available from Borg-Warner Corp., METABLEN C 223 copolymer, commercially available from M & T Chemicals, Inc., and KANE Ace-B copolymer, commercially available from Kaneka America Corp.

Liquid rubbers may also be employed. For instance, liquid olefinic-terminated elastomers as described in U.S. Pat. No. 4,223,115 (Zalucha et al); U.S. Pat. No. 4,452,944 (Dawdy); U.S. Pat. No. 4,769,419 (Dawdy); U.S. Pat. No. 5,641,834 (Abbey et al), U.S. Pat. No. 5,710,235 (Abbey et al) and WO 97/39074 (Lord Corp).

The rubber is preferably dissolved in the monomer. The preferred rubbers are solid materials which are preferably masticated on a mill prior to dissolution in the vinyl ether or propenyl ether monomers. Properties of the cured adhesive composition will vary somewhat with the degree of mastication, the effects of which may be determined with routine experimentation for any given rubber polymer. The rubbers should show little or no sign of phase separation once fully dissolved in the monomer.

The toughener may optionally be treated with a deionized water or methanol wash.

The amount of toughener can be varied to suit particular applications. A high level of toughener increases the viscosity of the resulting adhesive. The concentration range of elastomeric polymer will suitably be from about 3 to about 50 percent by weight, preferably 5 to about 30 percent, and more preferably about 7 to about 25% based on the weight of the composition. Mixtures of tougheners can be used if desired.

The curable compositions of the present invention also include a cationic photoinitiator, suitably an onium salt represented by the general formula:

$$[R^2\text{-}A^+][X^-]$$

where $R^2$ is an aromatic radical, for instance aryl, alkaryl, and aralkyl groups, including fused ring structures comprising an aromatic ring, which may be optionally substituted with a linear, branched or cyclic $C_8$ to $C_{20}$ radical of alkyl, alkylene, alkoxy alkyleneoxy, a nitrogen, oxygen or sulfur heterocyclic radical of 4 to 6 carbon atoms in the ring; or a mixture thereof, $A^+$ is selected from the group of iodonium cation mono-substituted with $C_1$ to $C_{20}$ alkyl or aryl optionally substituted with $C_1$ to $C_{20}$ alkyl or alkoxy and sulfonium cation di-substituted with $C_1$ to $C_{20}$ alkyl or aryl optionally substituted with $C_1$ to $C_{20}$ alkyl or alkoxy or a mixture thereof and $X^-$ is a non-basic, non-nucleophilic anion, examples of which include $SbF_6^-$, $AsF_6^-$, $PF_6^-$, $BF_4^-$, $ClO_4^-$, $CF_3SO_3^-$ and the like. Examples of such cationic photoinitiators are diaryliodonium, triarylsulfonium, diaryliodosonium, triarylsulfoxonium, dialkylphenacylsulfonium and alkylhydroxyphenylsulfonium salts. Syntheses of such onium salts are described in U.S. Pat. No. 4,219,654 (Crivello); U.S. Pat. No. 4,058,400 (Crivello); U.S. Pat. No. 4,058,401 (Crivello) and U.S. Pat. No. 5,079,378 (Crivello). Although various members of the series of onium salts indicated above may be used in the practice of this invention, those bearing the $SbF_6^-$ anion are preferred. Commercial aryl onium salt cationic photoinitators include UVI-6974, from Dow Chemical and UVE 1014 and UVE 1016 from General Electric Co.

Other suitable cationic photoinitiators include $\eta^5,\eta^6$-iron arene complex salt catalysts as described in U.S. Pat. No. 4,808,638 (Steinkraus et al) at cols 5–6. These catalysts, characterized as "ferrocenium salt" catalysts include, for instance IRGACURE 261, [$\eta^5$-2,4-cyclopentadien-1-yl][(1,2,3,4,5,6-$\eta$)(1-methyl ethyl)benzene]-iron (+)-hexafluorophosphate(−), sold by Ciba Speciality Chemicals.

An effective amount of the cationic photoinitiator is from about 0.01% to about 20% by weight.

The compositions are cured by transmitting energy effective to activate the photoinitiator to the composition, suitably by irradiation, typically with UV or visible light. Irradiation of substrates treated in accordance with the practice of the invention can be achieved by the use of UV lamps such as mercury arc lamps (high, medium and low pressure), xenon arc lamps, high intensity halogen-tungsten arc lamps, microwave driven arc lamps and lasers. Additional means of irradiation which can be used are, for example, x-rays, ionizing irradiation using $^{60}$Co γ-rays and electron beam irradiation. In some cases the compositions may also be curable by heat or by IR irradiation.

The inventive adhesives may be made sensitive to long wavelength UV and to visible light by the addition of photosensitizers, in addition to the cationic photoinitiators, as described in U.S. Pat. No. 4,610,952 (Crivello). Among such photosensitizers may be mentioned Michler's ketone, perylene, pyrene, anthracene, benzophenone, thioxanthone, 2-isopropylthioxanthone and phenothiazine.

In addition to the monomer, elastomeric polymer and photoinitiator components described above, the coating formulations may also include non-elastomeric polymers such as poly(methyl methacrylate), polystyrene, poly-α-methylstyrene, polyacenaphthalene, polyindene, polyphenols, and novolac resins. Inorganic fillers such as silica, talc, clay, barytes, hydrated alumina and glass, polyolefin or polyimide fibers may also be included to provide desirable mechanical characteristics, provided that they are not supplied in sufficient amount to preclude sufficient light penetration to the desired cure depth to effect cure initiation within a reasonable irradiation time.

The inventive compositions may also optionally contain other conventional additives e.g. to regulate storage stability, viscosity, surface wetting properties, to promote adhesion, and the like.

The invention is illustrated by the following non-limiting examples.

EXAMPLES

Formulations were prepared by mixing the components identified in Table 1, below, first dissolving the polymer component in the monomer component and then adding the photoinitiator. The formulation viscosities, measured with Brookfield viscometer, spindle #28, 10 RPM, 25° C. are also given in Table 1.

TABLE 1

| Components | 1 | 2 | 3 |
|---|---|---|---|
| Monomer | | | |
| Triethylene glycol divinyl ether | 80 | 80 | 90 |
| Polymer | | | |
| Millathane 66 | 20 | | |
| Millathane 76 | | 20 | |
| poly(ethyl acrylate) | | | 10 |
| Photoinitiator | | | |
| Cryacure 6976 | 1.12 | 1.12 | 1.12 |
| Viscosity (mPa.s, 25° C.) | 8500 | 3800 | 3650 |

The formulations were cured in 20 mil thick glass molds by irradiating a Loctite Fusion LC-6 UV conveyor oven, equipped with a mercury lamp producing broad spectrum UVA output generating an intensity at the substrate of 1.664 W/cm$^2$, measured at 365 nm using a EIT UV power pack, yielding a power of 2.851 J/cm$^2$ per pass. The molds were passed through the conveyer 2 times for each side, for a total of four passes. Tensile properties of the films produced in this way (averages of 5 samples each) are reported in Table 2.

UV cured adhesive shear strengths were also determined for 1 inch×1 inch (2.54 cm×2.54 cm) polycarbonate first blocks bonded to second, same sized, blocks of polycarbonate or polyvinyl carbonate using a ½ inch (1.27 cm) overlap, cured in a Loctite Zeta 7200 Medium pressure Hg UV oven for 30 sec by irradiating through the first polycarbonate block, and testing after 24 hrs. Adhesive shear strengths were determined using a Tinus Mechanical tester equipped with a special fixture. Results of these tests are given in Table 2.

TABLE 2

| Formulation | 1 | 2 | 3 |
|---|---|---|---|
| Film tensile strength | 500 | 830 | 637 |
| PC/PC Block Shear Strength | 1794 | 1621 | 1503 |
| PC/PVC Block Shear Strength | 1533 | 557 | 493 |

These results demonstrate that the inventive formulations can function as effective structural adhesives The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to." Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

What is claimed is:

1. A radiation curable adhesive composition comprising:
   a) an α,β-olefinically unsaturated ether monomer component comprising one or more compounds having the formula:

$$R[O\text{---}CH\text{=}CHR^1]_n \quad (I)$$

where R is an n-valent organic group linked by a carbon atom to the oxygen atom to which R is attached, $R^1$ is a monovalent organic group linked by a carbon atom to the carbon atom to which $R^1$ is attached, and n has a value of 1 or more,
   b) an elastomeric polymer, and
   c) a cationic photoinitiator.

2. An adhesive composition as in claim 1 wherein in formula (I), n is 1 to 100.

3. An adhesive composition as in claim 1 wherein in formula (I), n is 1–6.

4. An adhesive composition as in claim 1 wherein R and R' are selected from the group consisting of 1–40 carbon aromatic or aliphatic hydrocarbon groups, polyethers, cycloethers, residues of hydroxyl terminated urethane oligomers, residues of hydroxyl terminated polyesters, and mixtures thereof.

5. An adhesive composition as in claim 1 wherein the monomer component a) is employed in the composition in an amount of from about 20% to about 98% by weigh of the composition.

6. An adhesive composition as in claim 5 wherein to monomer component a) includes at least one member selected from the group consisting of 1,2-dipropenoxyethane, 1,4-dipropenoxybutane, 1,6-propenoxyhexane, 1,3-dipropenoxypropane, 1,4-cyclohexanedimethanol dipropenyl ether, 1,4-cyclohexane dipropenyl ether, 1,2-dipropenoxypropane, 1,10-dipropenoxydecane, 1,8-dipropenoxyoctane, 1,2,3-tripropenoxypropane, 1,2,3,4-tetrapropenoxybutane, sorbitol hexapropenyl ether, trimethylolpropane tripropenyl ether, pentaerythritol tetrapropenyl ether, 1,2-dipropenoxycyclopentane, 1,3-dipropenoxyperfluoropropane, diethyleneglycol dipropenyl ether, tetraethyleneglycol dipropenyl ether, and 3,4-dipropenoxytetrahydrofuran.

7. An adhesive composition as in claim 1 wherein the elastomeric polymer component b) is selected from the group consisting of acrylic rubbers, butadiene/acrylonitrile rubber, styrene/butadiene rubber, buna rubber, polyisobutylene, polyisoprene, natural rubber, polyurethane rubbers, ethylene-vinyl acetate polymers, fluorinated rubbers, isoprene-acrylonitrile polymers, chlorosulfonated polyethylenes, homopolymers of polyvinyl acetate, and mixtures thereof.

8. An adhesive composition as in claim 7 wherein the elastomeric polymer-component b) is an acrylic rubber selected from the group consisting of (i) homopolymers of alkyl esters of acrylic acid, (ii) copolymers of another polymerizable monomer with an alkyl ester of acrylic acid or with an alkoxy ester of acrylic acid, (iii) copolymers of alkyl esters of acrylic acid with each other, (iv) copolymers of alkoxy esters of acrylic acid with each other, and (v) mixtures of any of the above (i)–(iv).

9. An adhesive composition as in claim 1 wherein the elastomeric polymer component b) has an average molecular weight of greater than 5,000.

10. An adhesive composition as in claim 9 wherein the elastomeric polymer component b) has an average molecular weight of more than about 100,000, a Mooney viscosity of between 20 and about 60, and a glass transition temperature of 15° C. or less.

11. An adhesive composition as in claim 1 wherein the elastomeric polymer component b) is an A-B-A block copolymer wherein the A block is polymerized segment of styrene, alpha-methyl styrene, t-butyl styrene, or other ring alkylated styrene, acrylonitrile, methyl methacrylate, or a mixture of some or all of the above and the B block is an elastomeric segment derived from a conjugated diene or copolymer thereof or is an ethylene-propylene polymer.

12. An adhesive composition as in claim 1 wherein the elastomeric polymer component b) is present in the composition in an amount of 3 to about 50 percent by weight.

13. An adhesive composition as in claim 1 wherein the cationic photoinitiator component c) comprises an onium salt represented by the general formula:

$$[R^2\text{-}A^+][X^-]$$

where $R^2$ is an aromatic radical or a mixture thereof, $A^+$ is selected from the group consisting of iodonium cation mono-substituted with $C_1$ to $C_{20}$ alkyl or aryl optionally substituted with $C_1$ to $C_{20}$ alkyl or alkoxy and sulfonium cation di-substituted with $C_1$ to $C_{20}$ alkyl or aryl optionally substituted with $C_1$ to $C_{20}$ alkyl or alkoxy or a mixture thereof and $X^-$ is a non-basic, non-nucleophilic anion, or an $\eta^5,\eta^6$-iron arene complex salt catalyst.

14. An adhesive composition as in claim 13 wherein $R^2$ is aryl, alkaryl, or aralkyl, any of which may be optionally substituted with a linear, branched or cyclic $C_8$ to $C_{20}$ radical of alkyl, alkylene, alkoxy, alkyleneoxy, a nitrogen, oxygen or sulfur heterocyclic radical of 4 to 6 carbon atoms in the ring and $X^-$ is $SbF_6^-$, $AsF_6^-$, $PF_6^-$; $BF_4^-$; $ClO_4^-$, or $CF_3SO_3^-$.

15. An adhesive composition as in claim 1 wherein the cationic photoinitiator component c) is selected from the group consisting of "diaryliodonium salts, triarylsulfonium salts, diaryliodosonium salts, triarylsulfoxonium salts, dialkylphenacylsulfonium salts," alkylhydroxyphenylsulfonium salts and mixtures thereof.

16. An adhesive composition as in claim 1 wherein the cationic photoinitiator component c) is present in the composition in an amount of from about 0.01% to about 20% by weight.

17. An adhesive composition as in claim 1 further comprising one or more members of the group consisting of non-elastomeric polymers, inorganic fillers, storage stabilizers, viscosity modifiers, surface wetting property modifiers and adhesion promoters.

18. An adhesive composition as in claim 1 wherein the elastomeric polymer component b) has a tensile strength at break of greater than 2000 psi (13790 kPa) and an elongation at break of greater than 200%.

19. An adhesive composition as in claim 18 wherein said elastomeric polymeric component is a block copolymer which includes at least one block segment having a Tg of −20° C. or less.

20. An adhesive composition as in claim 1 wherein $R^1$ is H or $C_{1-10}$ alkyl.

21. An adhesive composition as in claim 1 wherein $R^1$ is H or methyl.

22. An adhesive composition as in claim 1 wherein the elastomeric polymer b) has a tensile strength at break of greater than 1500 psi (10342 kPa), and an elongation at break of greater than 100%.

23. An adhesive composition as in claim 1 wherein component a) is employed in the composition in an amount of from about 45% to about 98% by weight of the composition.

24. An adhesive composition as in claim 23 wherein component a) includes at least one member selected from the group consisting of butyl vinyl ether, hydroxy butyl vinyl ether, cyclohexyl vinyl ether, phenoxy vinyl ether, 2-ethylhexyl vinyl ether, lauryl vinyl ether, cetyl vinyl ether, octadecyl vinyl ether, divinyl ether of hexanediol, divinyl ether of cyclohexane dimethanol, divinyl ether of triethylene glycol, divinyl ether of bisphenol A, divinyl ether of alkoxylated bisphenol A, divinyl ether of tetraethylene glycol, divinyl ether of glycerol, trivinyl ether of glycerol, divinyl ether of trimethylolpropane, trivinyl ether of trimethylolpropane, divinyl ether of pentaerythritol, trivinyl ether of pentaerythritol tetravinyl ether of pentaerythritol, 1,2-dipropenoxyethane, 1,4-dipropenoxybutane, 1,6-propenoxyhexane, 1,3-dipropenoxypropane, 1,4-cyclohexanedimethanol dipropenyl ether, 1,4-cyclohexane dipropenyl ether, 1,2-dipropenoxypropane, 1,10-dipropenoxydecane, 1,8-dipropenoxyoctane, 1,2,3-tripropenoxypropane, 1,2,3,4-tetrapropenoxybutane, sorbitol hexapropenyl ether, trimethylolpropane tripropenyl ether, pentaerythritol tetrapropenyl ether, 1,2-dipropenoxycyclopentane, 1,3-dipropenoxyperfluoropropane, diethyleneglycol dipropenyl ether, tetraethyleneglycol dipropenyl ether, and 3,4-dipropenoxytetrahydrofuran.

25. A method of bonding comprising
    A) applying a composition as in claim 1 to a substrate,
    B) joining a second substrate, at least one of the substrates being transmissive to energy effective to activate the photoinitiator, and
    C) transmitting energy effective to activate the photoinitiator through said transmissive substrate to the composition to effect cure of the composition.

26. A method as in claim 25 wherein said energy effective to activate the photoinitiator is heat, e-beam or electromagnetic energy in the infrared, visible, ultraviolet or x-ray spectrum.

27. A method as in claim 26 wherein said energy effective to activate the photoinitiator is electromagnetic energy in the infrared, visible or ultraviolet spectrum.

28. A bonded assembly produced by the method of claim 25.

29. An assembly comprising a pair of substrates bonded by a cured adhesive formulation wherein the adhesive formulation is a composition as in claim 1.

30. A polymeric reaction product obtained by curing a composition as in claim 1.

31. A polymeric reaction product as in claim 30 wherein in formula 1, R' is $C_{1-10}$ alkyl.

32. An adhesive composition comprising:
    a) an α,β-olefinically unsaturated ether monomer component consisting of one or more compounds having the formula:

$$R[O\text{---}CH\text{=}CHR^1]_n \qquad (I)$$

where R is an n-valent organic group linked by a carbon atom to which R attached, $R^1$ is H or an n-valent organic group linked by a carbon atom to the carbon atom to which $R^1$ is attached, and n has a value of 1 or more, b) an elastomeric polymer having a tensile strength at break of greater than 1500 psi (10342 kPa), and an elongation at break of greater than 100%, and
c) a cationic photoinitiator, wherein the elastomeric polymer component b) is a millable polyurethane rubber.

33. A radiation curable adhesive composition comprising:
    a) an α,β-olefinically unsaturated ether monomer component selected from the group consisting of compounds having the formula:

$$R[O\text{---}CH\text{=}CHR^1]_n \qquad (I)$$

where R is an n-valent organic group linked by a carbon atom to the oxygen atom to which R attached, $R^1$ is H or an n-valent organic group linked by a carbon atom to the carbon atom to which $R^1$ is attached, and n has a value of 1 or more, and mixtures thereof, said unsaturated ether component being present in an amount of greater than 40% to about 98% by weight of the composition, b) an elastomeric polymer component having a tensile strength at break of greater than 1500 psi (10342 kPa), and an elongation at break of greater than 100%, said elastomeric polymer component being selected from the group consisting of acrylic rubbers, butadiene/acrylonitrile rubber, styrene/butadiene rubber, buna rubber, polyisobutylene, polyisoprene, natural rubber, polyurethane rubbers, ethylene-vinyl acetate polymers, fluorinated rubbers, isoprene-acrylonitrile polymers, chlorosulfonated polyethylenes, homopolymers of polyvinyl acetate, and mixtures thereof, and
    c) a cationic photoinitiator.

34. An adhesive composition as in claim 33 wherein in formula (I), n is 1 to 100.

35. An adhesive composition as in claim 33 wherein in formula (I), n is 1–6.

36. An adhesive composition as in claim 33 wherein R and R' are selected from the group consisting of 1–40 carbon aromatic or aliphatic hydrocarbon groups, polyethers, cycloethers, residues of hydroxyl terminated urethane oligomers, residues of hydroxyl terminated polyesters, and mixtures thereof.

37. An adhesive composition as in claim 33 wherein the elastomeric polymer component b) is an acrylic rubber selected from the group consisting of (i) homopolymers of alkyl esters of acrylic acid, (ii) copolymers of another polymerizable monomer with an alkyl ester of acrylic acid or with an alkoxy ester of acrylic acid, (iii) copolymers of alkyl esters of acrylic acid with each other, (iv) copolymers of alkoxy esters of acrylic acid with each other, and (v) mixtures of any of the above (i)–(iv).

38. An adhesive composition as in claim 33 wherein the elastomeric polymer component b) has an average molecular weight of more than about 100,000.

39. An adhesive composition as in claim 33 wherein the elastomeric polymer component b) is present in the composition in an amount of 3 to about 50 percent by weight.

40. A radiation curable composition comprising:
    a) an α,β-olefinically unsaturated ether monomer,
    b) at least one member of the group consisting of millable polyurethane elastomers, fluorinated, rubbers, isoprene-acrylonitrile polymers and chlorosulfonated polyethylenes, and
    c) a cationic photoinitiator.

* * * * *